Sept. 18, 1956 V. CLAIR, JR 2,763,057
COLD PRESSURE WELDING OF METAL FOIL
Filed July 12, 1954 3 Sheets-Sheet 1
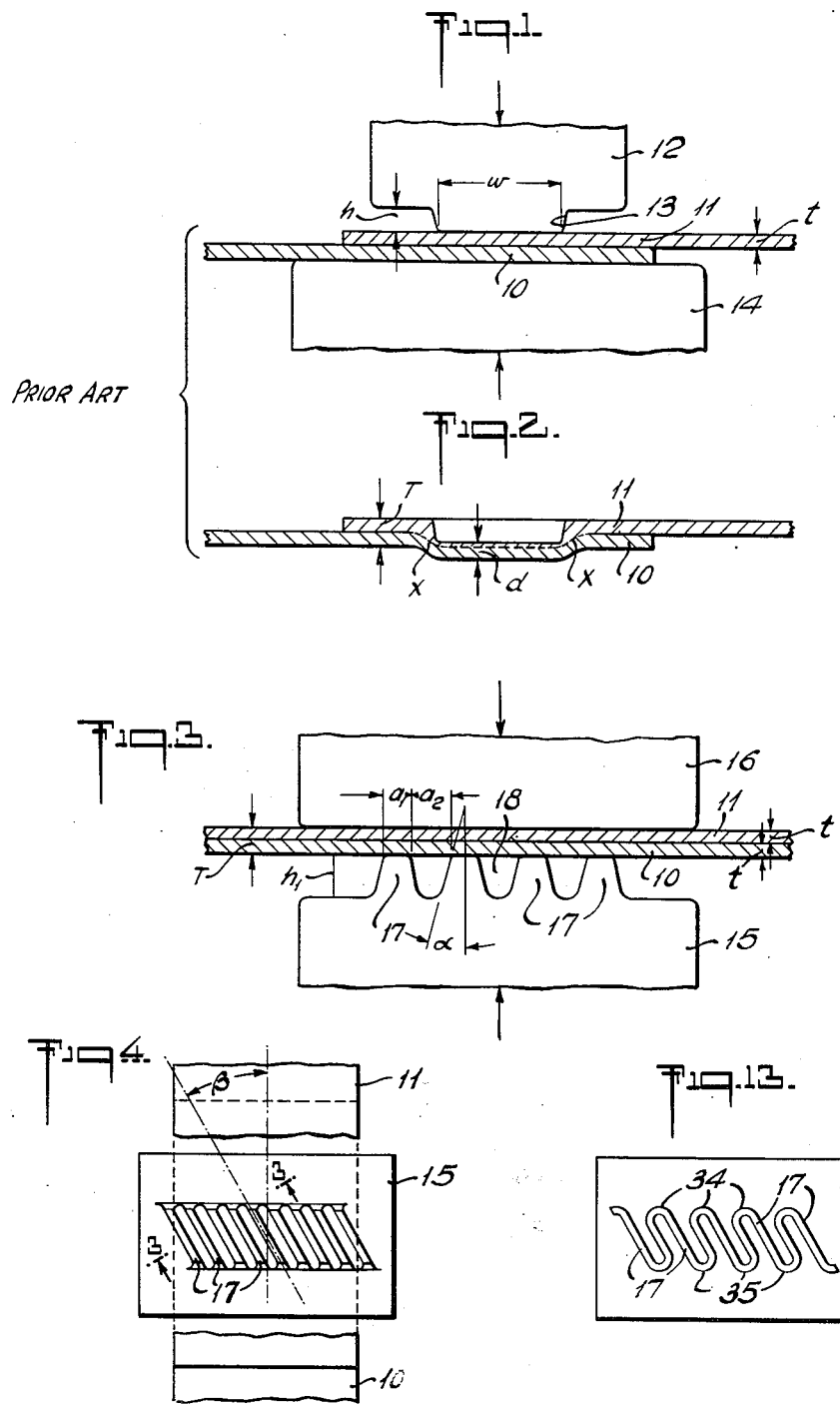
INVENTOR
VERNE CLAIR JR.
BY
ATTORNEY Sept. 18, 1956  V. CLAIR, JR  2,763,057
COLD PRESSURE WELDING OF METAL FOIL
Filed July 12, 1954  3 Sheets-Sheet 2
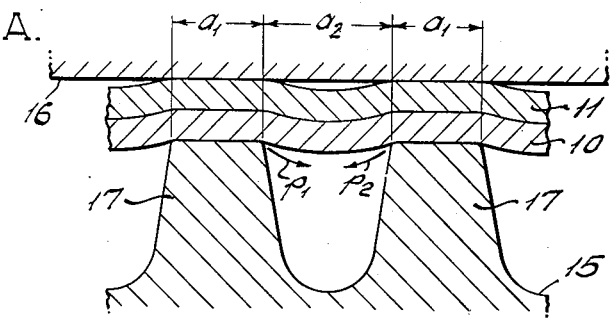
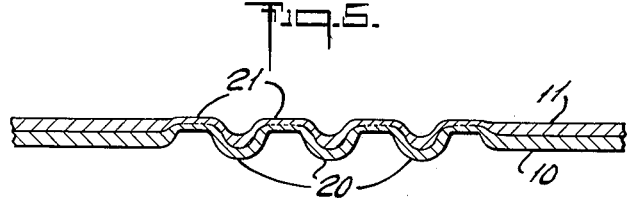
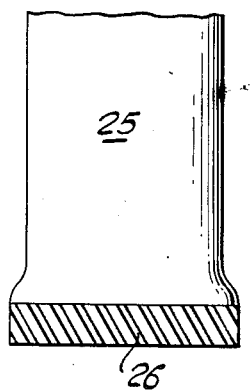
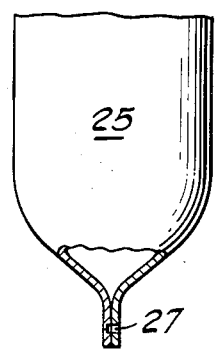
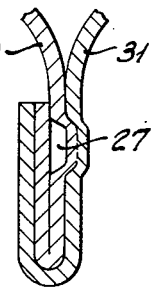
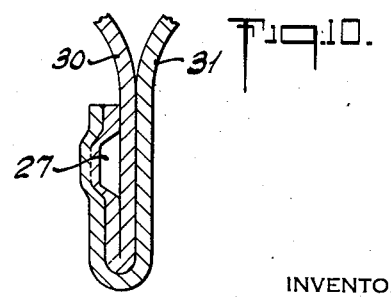
INVENTOR
VERNE CLAIR JR.
BY
ATTORNEY Sept. 18, 1956  V. CLAIR, JR  2,763,057

COLD PRESSURE WELDING OF METAL FOIL

Filed July 12, 1954  3 Sheets-Sheet 3

INVENTOR
VERNE CLAIR JR.
BY
ATTORNEY

United States Patent Office 2,763,057
Patented Sept. 18, 1956

2,763,057

COLD PRESSURE WELDING OF METAL FOIL

Verne Clair, Jr., Levittown, N. Y., assignor to Koldweld Corporation, New York, N. Y., a corporation of New York Application July 12, 1954, Serial No. 442,558

3 Claims. (Cl. 29—470.1)

The present invention relates to cold pressure welding, that is, the joining of metallic members of aluminum, copper, or other ductile and cold pressure weldable material substantially by pressure, more particularly to the welding of members of relatively small thickness, such as pieces of metal sheet or foil.

As is well known in cold pressure welding, that is, the process of joining metals under conditions where no liquid phase is produced or introduced into the weld at any stage or welding is effected solely by pressure and without the application of extraneous welding heat, a suitable design of the pressure welding tools or dies and a proper control of the tool pressure, after proper cleaning of the areas of contact to be joined to remove surface contamination or matter foreign to the metal, results in an interfacial cold or plastic flow of the metals of the adjoining surfaces sufficient to effect merging thereof into a solid phase welding bond or joint.

There has already been proposed, for example in the specification of U. S. Patent 2,522,408, a method of and means for lap welding a pair of metallic members by a cold welded joint, such as plates, sheets, or the like, of aluminum, copper or other ductile metal or metal alloy capable of cold pressure welding. More specifically, said patent discloses various techniques and tools for producing either a continuous line weld or a spot weld at one or more limited areas of two lapped or superposed members to be welded.

Since, as described in said patent, in cold pressure welding metal must flow laterally of the area subjected to pressure by the welding tools, or, in other words since the metals of the contacting surfaces are expanded under pressure to effect merging into a true welding bond, the most efficient tool shape or pressure area has been found to be of a strip-like or rectangular shape, with the width of the strip or rectangle being approximately equal to or of the order of the gauge thickness of the members being welded, but not being any more than about twice said thickness.

This shape or width of the welded area, in addition to requiring a minimum distortion or tool penetration at the area being welded, that is about 60% of the total thickness of the members being welded for aluminum and about 86% for copper, insures a favorable and unimpeded flow of the metal laterally of the contacting surfaces, whereby to enable the attainment of an intimate welded bond of adequate mechanical strength with a minimum of applied pressure and resultant distortion of the members at and near the welded area.

In making lap pressure welds of this type, as the thickness of the members to be welded decreases, the necessarily reduced dimension of the pressure tools makes it increasingly difficult to control the tool penetration so as to insure efficient and consistent welding with sufficient accuracy. As a result, in following the conventional cold pressure welding technique, as described in the above-mentioned patent, a practical limit is reached for members of greatly reduced thickness, practically from about 0.030" on downward and better known as sheets or foils, where any effective and reliable welding will no longer be possible, both on account of the minute size of the welding tool or area and due to the difficulty of controlling the tool penetration or indentation required to insure dependable welding.

It has already been proposed, in order to weld relatively thin members of pressure weldable material, such as pieces of metal sheet or foil, to follow a modified and improved technique or method described by Patent No. 2,707,889 and comprising applying welding pressure to a strip-like area of the lapped members to be welded whose width is a substantial multiple of, that is at least twice, the thickness of the members being welded. As a result of the increased width of the area or pressure tool face, metal is not only caused to flow laterally and in the direction of the interface between the members, as in the case of welding relatively thicker members using a tool width of the order of the gauge thickness of the members, but there is produced a stretching or drawing action causing expansion or flow of the metal around the welding tool or tools and resulting in a distortion of the members in a direction at right angle to the plane thereof. This stretching action or coexpansion of the contacting metal surfaces, while promoting the formation of a uniform welded joint over the entire weld area, has the additional effect of breaking up or dispersing the superficial oxide film always present upon the surface, especially in the case of aluminum, into minute particles, thus enabling welding without pre-cleaning of the members, except for the removal of contaminating foreign matter, such as dirt, grease, etc. As a result, the cross-section of a weld joint of this type assumes the shape of a trough or channel due to the drawing effect or upflow of the metal around the edges of the pressure tool.

It has furthermore been found in cold pressure welding that the most critical phase during the welding operation consists in the starting of the welding action or initial pickup of the metals of the two members while, with welding having once started at a limited point or area, usually in the center of the weld line or strip, it will spread readily to the edges or periphery of the weld area by the continued pressure application. In making a foil weld of the type described, an initial and safe pickup of the metals is insured by the drawing or stretching action on the metals, thus insuring merging and welding safely and reliably.

While it has been thus possible to produce a sound and reliable cold weld joint between two relatively thin members, such as sheets or foils, it will be understood that such weld or joint still suffers greatly from a strength point of view, thus rendering its use limited if not prohibitive for most practical purposes. Both the substantial metal reduction at the weld line or area as well as the linear shape of the weld, result in a low resistance to bending of the joints as well as other defects well known and understood.

Accordingly, an object of the present invention is the provision of an improved method of cold pressure welding a pair of metal members of relatively small thickness, such as sheets or foils, whereby the defects and drawbacks of previous welding methods are substantially eliminated.

Another object is the provision of a combined cold pressure welding and forming method for joining together two metal foil members or the like, whereby to attain both an efficient weld joint between the members as well as to increase the mechanical strength of the joint produced by means of a single operating step or pressure application.

Another object is the provision of a method of cold pressure welding a pair of metal foil members or the like, whereby the welding pressure is controlled automatically and cutting or tearing of the foils is practically avoided.

A more specific object of the invention is the provision of a simple and efficient method of sealing the ends of collapsible metal tubes of pressure weldable material, to effect both a hermetic sealing of the tubes and to produce a mechanically strong joint capable of withstanding handling and abuse both during assembly and use.

Another object is the provision of a simple and efficient method of making a multiple spot weld joint of two metal foil pieces or the like, while at the same time mechanically strengthening the joint produced.

The above and further objects, as well as novel aspects of the invention, will be better understood from the following detailed description taken in reference to the accompanying drawings forming part of this specification and wherein:

Fig. 1 diagrammatically shows a tool arrangement and a pair of metal foils or the like inserted therein prior to welding in accordance with the previously known method of welding metal foil;

Fig. 2 is a cross-section through the completed welded joint obtained by a method illustrated in Fig. 1;

Fig. 3 shows a tool arrangement and a pair of metal foils or the like inserted therein prior to welding, in accordance with the improved technique and method of the present invention;

Fig. 3A is a fractional view showing, on an enlarged scale, the position of the welding tool and foils of Fig. 3 during an initial stage of the welding operation after application of the welding pressure;

Fig. 4 is a top view, on a reduced scale, of the lower tool member of Fig. 3, with portions of the foils being broken away to reveal the shape of the tool;

Fig. 5 is a cross-section through the completed welded joint of the foils of Fig. 3 obtained by the process according to the invention;

Fig. 6 shows the end of a collapsible metal tube with its flattened end welded in accordance with the invention;

Fig. 7 is a side view, shown partly in section, of the flattened end of a collapsible tube welded by a linear weld according to previous methods, to produce a hermetic seal of the tube;

Fig. 8 is a view of a collapsible tube similar to Fig. 6 illustrating a combined linear seal and multiple diagonal weld according to the present invention;

Figs. 9 and 10 illustrate, on an enlarged scale, specific methods of combining a single line weld with a multiple weld according to the invention for sealing collapsible metal tubes;

Fig. 13 is a top view showing a modified tool shape for producing a multiple line weld and hermetic seal according to the invention by a single or unitary welding step;

Like reference characters identify like parts throughout the different views of the drawings.

Figure 11:
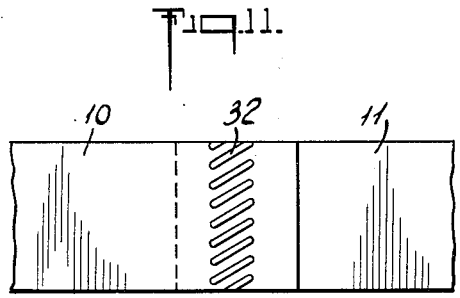
Fig. 11 shows schematically a multiple line diagonal weld joint of two metal foil strips or the like made in accordance with the invention.

Referring more particularly to Figs. 1 and 2 of the drawings, there is shown a welding tool arrangement for producing a single strip-like welded joint according to the previously known welding method as described by Patent No. 2,707,889. Items 10 and 11 represent the superposed elements, such as a pair of metal foils or the like to be welded, consisting of aluminum, copper or any other ductile and cold pressure weldable material. The principal upper welding tool or die 12 is provided with a tip 13 having a width $w$ which is a substantial multiple, practically at least twice the gauge thickness $t$ of the members 10 and 11 to be welded. The length of the tip 13 or welding area is in turn a multiple of the width $w$, that is, at least three times or more of said width, to result in a strip-like or linear weld area. The cooperating lower tool 14 has the form of a substantially flat anvil, both tools 12 and 14 being suitably structurally embodied in a pressure applying device, such as a pair of pliers or the like.

In an arrangement of this type, as the tool 12 is brought down under pressure upon the contacting members 10 and 11, as indicated by the arrows in the drawing, a substantial amount of metal will be displaced due to the relatively large pressure area. This metal displacement causes the metal to flow up and around the tool tip 13, thereby producing a drawing or stretching action on the metal as clearly shown in Fig. 2. In other words, while in the case of welding relatively thick members, with the tool width being of the order of the gauge thickness $t$, metal flows substantially in a direction laterally of the interface between the members, the metal adjacent to the pressure area in Fig. 1, with the tool width $w$ being a substantial multiple of the gauge thickness $t$, will be extended around the tool, so that there will be a spreading of the weld to areas adjacent and outside the pressed area or areas opposite to the tip or indenter 13, as indicated at $x$ in Fig. 2. At the same time a coexpansion or drawing of the mating metal surfaces around the tool tip 13 occurs, resulting both in a breaking up of the oxide film and promoting the merging or joining of the metals into a true solid phase weld bond.

The thickness $d$ at the pressed area should be about 40% of the total thickness $T$ of the members for aluminum and in any case will be in accordance with the weldability of the material such as expressed by the "Figure of Merit" in the table included in the above-mentioned patent specification. As a result of the drawing action or coexpansion at the interface, welding takes place uniformly over the entire welding area as well as at the adjacent areas, as indicated by the dotted lines in Fig. 2, as a result of the upflow of the metal as described and shown in the drawing. The weld thickness $d$ is advantageously controlled by the height $h$ of the tool tip 13, although such a control becomes increasingly difficult as the gauge thickness $t$ decreases, for reasons that appear to be obvious.

In order to insure welding of two members in the manner described, the areas of contact to be joined should be free from contaminating matter and for this purpose must be properly cleaned, such as by mechanical scratch-brushing, to remove the oxide film and other matter foreign to the metal or to provide pure metallic surfaces contacting each other prior to welding. However, as pointed out above, due to the relatively large pressure areas, as used in welding foils according to this process, and as a result of the drawing action or coexpansion of the metals as described, cleaning, as far as removal of the oxide film is concerned, may be dispensed with in most cases, the film being readily broken up or dispersed by the high initial pressure and stretching of the metals in a manner readily understood.

A strip-like or linear weld of the type according to Fig. 2, while providing a safe and dependable weld joint, is unsuited for many purposes and uses, both on account of the reduced metal thickness at the weld area as well as due to its lack of mechanical strength, especially to bending about the axis of the weld strip or line. Thus, for example, in using a weld of this type for sealing the flattened end of a collapsible metal tube, the joint produced, while providing a perfect seal of the tube, is unable to withstand repeated abuse, both during manufacture as well as during handling and use. Similar drawbacks exist with practically any sheet or foil weld made in the conventional manner according to Figs. 1 and 2, especially where mechanical strength or stiffness of the weld joint are required.

Another disadvantage of a conventional foil weld according to Figs. 1 and 2 is due to the difficulty of controlling the metal reduction or tool penetration, to prevent tearing or cutting of the foils and to reduce the number of inferior welds or rejects. Due to the small thickness of metal foils or sheets, control of the depth or tool penetration by means of a stop or by the height $h$ of the tool tip becomes increasingly more difficult as the gauge thickness $t$ decreases and where consistency and reliability of the welded joints are required.

According to the present invention, the above-mentioned difficulties and defects, inherent in the previous method of cold pressure welding metal foils or the like, are substantially overcome by an improved technique or process of welding involving generally the production of a multiplicity of uniformly spaced, such as parallel strip-like welds, to result in an automatic control of the welding operation, on the one hand, and to cause a corrugation or crinkling of the welded portion of the members, on the other hand, simultaneously with the welding or joining of the members at said areas. This combined effect may be achieved, in accordance with one aspect of the invention, by the use of a first welding tool having a flat surface and projecting therefrom a plurality of parallel indenting ribs having a suitable width and being spaced by a predetermined distance one from the other. This tool cooperates with a second substantially flat tool or anvil in such a manner as to effect, in addition to the indenting and welding of the members by said ribs, both a control of the welding as well as a stiffening or corrugating of the members, to improve the mechanical strength of the joint produced. A similar effect may be obtained by producing a plurality of weld spots properly spaced one from the other, such as by means of two tools having ribs crossing one another at an angle, whereby welding takes place at the intersecting areas of said ribs, as described in greater detail hereafter.

In other words, the invention is predicated on the thought of utilizing the stretching or upflow of the displaced metal in a foil welding process according to Figs. 1 and 2 to deform the metal between the indented and welded areas into stiffening portions or ribs, whereby to increase the strength of the joint, in a manner readliy understood and described in the following.

Referring more particularly to Figs. 3 and 4, there is shown a tool arrangement according to the invention for welding two relatively thin metal members 10 and 11 comprising essentially a lower welding tool 15 provided with a flat rectangular surface and having projecting therefrom a plurality of outwardly tapering and parallel indenters or welding tongues 17 of a width $a_1$ and being spaced from each other by distances $a_2$. The width $a_1$ of the indenters should be a multiple of, that is at least twice, the gauge thickness $t$ of the members 10 and 11, while the distance $a_2$ between the tongues for most practical purposes should be greater than, that is, about 1.5 times the width $a_1$, as shown in the example illustrated in the drawing. Furthermore, the height $h_1$ of the tongues 17, while not critical, should be designed in the manner explained and becoming further apparent from the following. The tapering angle $\alpha$ of the indenters 17 may be about 15°, although this value is not critical and may be varied within limits to suit existing conditions and requirements. The tools 15 and 16 may be made from mild steel or from unhardened chrome-manganese tool steel, the latter being especially suitable for the welding of aluminum.

The cooperating upper tool or anvil 16 has a flat surface, the superposed or contacting members 10 and 11 to be welded being inserted between the tools, in the manner shown in the drawing. Preferably the indenters form an angle $\beta$ with the short axis of the tool face, in the case illustrated, such as an angle of about 30°, to result in a joint maximum strength and stiffness, as will be further understood from the following.

Referring to Fig. 3 which shows the position of the welding tools and foils 10 and 11 prior to welding, a pressure applied by the tools upon the foils results in a combined welding of the foils by the indenters 17, on the one hand, and a pressing of the foils into a corrugated shape, on the other hand, thus causing a strengthening or stiffening of the joint. This will be further understood by reference to Fig. 3A which shows an enlarged fractional portion of Fig. 3 at an intermediate position, after the indenters 17 have been impressed to a slight extent into the foils after the start of the welding operation.

As a result of the indenting pressure, the metal at the areas $a_1$ and $a_2$ or opposite to the indenters is subjected to a drawing action, thus causing an expansion or stretching and resulting in a safe initiation of the welding or merging of the metals at the interface into a solid phase welding bond. At the same time, the stretching action causes a breaking up or dispersion of the superficial oxide film, usually present especially in the case of aluminum, thus allowing welding without cleaning at least as far as the removal of this film is concerned. Furthermore, due to the relationship between the width $a_1$ of the indenters 17, the gauge thickness $t$ and the width $a_2$ of the gap 18, the metal at the areas $a_2$, being allowed to move freely, will be caused to flow or displaced outside of the indented areas in a direction substantially opposite to the indenting pressure or around the edges of the indenters, as indicated by the arrows $p_1$ and $p_2$ in Fig. 3A. This, in turn, results in a buckling or distortion of the free metal portions causing the formation of stiffening regular wave-like or sinuous projections 20 between the welds 21, that is, deforming the welded areas of the members into a uniformly crinkled or corrugated shape of increased mechanical strength as shown more clearly in Fig. 5 representing a cross-section through the final weld joint.

In addition to the combined welding and corrugating of the members by the single pressure operation, as described above, the invention has the further advantage of affording an automatic welding control or control of the tool penetration as a result of the metal displaced by one of the indenters 17 being opposed by the metal displaced by the adjacent indenter.

More specifically, provided a proper design of the width $a_1$, the spacing distance $a_2$ and the height $h_1$ of the indenters 17, the metal will be allowed to flow relatively unimpeded during the initial stage of the pressure application, thus causing indentation and welding as well as corrugating of the members, in the manner described. However, as the pressure application is continued, the flow of the metal displaced laterally into the gaps 18 by one indenter (arrow $p_1$) will be increasingly opposed by the metal displaced in the opposite direction by the adjacent indenter (arrow $p_2$), resulting in the formation of stiffening ribs between the welded portions in the manner pointed out, until both flows or displacements substantially balance one another so as to prevent a further penetration by the indenters 17 and reduction of the metal thickness at the welds. As a result, by the proper design of the tool, the welding is controlled accurately and reliably in a most simple manner, compared with conventional welding methods, as pointed out and understood from the foregoing.

In practice it has been found that with a single tool satisfactory welding may be effected over a considerable range of gauge thickness and materials of a given ductility or degree of cold weldability, provided the width of the indenters is a suitable multiple of the gauge thickness and that the gaps between the indenters have a lower limit so as to enable a ready lateral metal flow during the initial stage of the welding process to initiate welding and corrugating, on the one hand, and an upper limit to cause a control or balance of the displaced metals upon reaching a predetermined tool penetration, on the other hand. From this it follows that the height $h_1$ of the indenters should be such as to accommodate the displaced metal and to enable the formation of the corrugations or stiffening ribs within the operating range of gauge thicknesses for which the tool is designed.

According to a practical example, a tool having indenters of a width $a_1$ equal to 0.020″, a spacing distance $a_2$ equal to 0.035″ and a height $h_1$ equal to 0.030″, has been found suitable for satisfactorily welding aluminum foils within a thickness range from about 0.002″ to 0.010″. For other thicknesses and materials of different ductility the most favorable tool dimensions can be determined simply by following the basic considerations and requirements as pointed out hereinabove.

The weld strips or stiffening ribs are preferably arranged to form a suitable angle with a predetermined axis of the members or the portions thereof to be joined, to result in a maximum strength or stiffening of the joint, as will be readily understood. Thus in the case of two simple foil strips 10 and 11, as shown in Fig. 4, the weld lines may form an angle $\beta$ of about 30° with the axis of the strips, to provide a maximum bending strength of the completed joint. The same applies to the case of welding the flattened end portions of a collapsible metal tube 25 by a series of diagonal welds 26 according to the invention, as indicated schematically in Fig. 6.

With reference to the latter, while the joint according to the invention and shown by Fig. 5 will afford a sufficient seal for certain uses and applications, complete hermetic sealing may be obtained by the combined use of a conventional sealing or welding method together with a method proposed by the present invention. Thus the tube 25 may first be sealed by linear indentation weld 27 across its flattened ends, whereupon the sealed area is additionally welded by a multiple diagonal weld 26 according to the present invention, to result in a combined seal and improved mechanical joint, as shown in Fig. 8.

Referring to the latter, the linear weld 27 insures a perfect hermetic seal of the tube, while the multiple diagonal line weld 26 provides the necessary strength or stiffness of the joint, in a manner readily understood. A double weld of this type may be applied directly to the flattened and overlapping end portions of the tube or the ends may be folded before welding, as shown in Figs. 9 and 10. According to the latter, there is first applied a linear indentation or weld 27, whereupon the tube end is folded and additionally welded by means of a tool according to the present invention. The linear weld or seal 27 may be located either inwardly or outwardly of the fold, as shown in Figs. 9 and 10, respectively, while the diagonal weld 26 is preferably applied from the side opposite to the linear weld.

Figure 12:
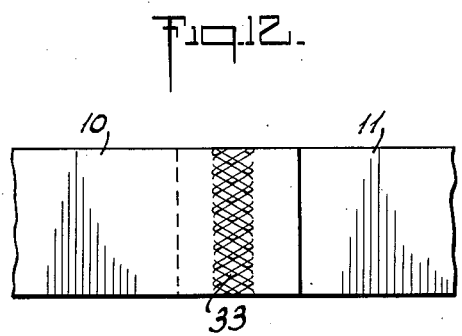
Fig. 12 shows a multiple spot weld joint made according to a modification of the invention.

Instead of producing multiple weld lines by a single indenting tool, according to Figs. 3 and 4, and schematically indicated at 32 in Fig. 11, both welding tools may be provided with indenting ribs or tongues, with the tongues of one tool intersecting the tongues of the other tool, whereby to result in a multiple spot weld pattern with the weld spots coinciding with the points of intersection of the welding ribs or line, as indicated schematically at 33 in Fig. 12.

Finally, in order to obtain both a hermetic seal and adequate mechanical strength of the welded joint by a single operation, the outer ends of the linear indenters or tongues 17 may be connected alternately at opposite sides of the tool, as shown at 34 and 35 in Fig. 13 to provide a continuous weld line. Accordingly, in addition to the welding at the diagonal strips and strengthening or stiffening of the members, there is thus provided a continuous weld line in the form of a slanted zig-zag shaped or sinuous weld line, resulting in both a hermetic seal and a joint of adequate mechanical strength, in a manner readily understood.

Figure 14:
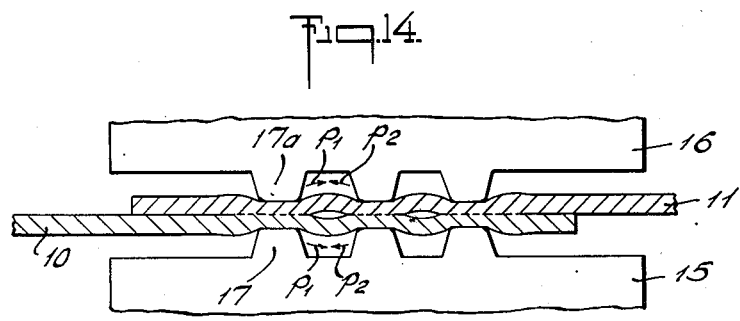
Fig. 14 is a view similar to Fig. 3, illustrating the use of twin-opposed indenters, the tools and foils being shown in the position shortly after the pressure application.

Fig. 14 more clearly shows an arrangement for welding two foils by means of tools having twin-opposed indenters 17 and 17a, as obtained simply by using a pair of tools, such as shown in Fig. 4, with the indenting ribs of one tool intersecting the ribs of the other tool, thus providing the equivalent of uniformly spaced diamond-shaped indenters 17 and 17a or weld areas, as indicated more clearly in Fig. 12. In a multiple spot or criss-cross weld of this type, the members 10 and 11 are distorted in opposite directions, as shown in Fig. 14, resulting in the formation of stiffening portions between the welds and increase of the mechanical strength of the joint produced. A criss-cross weld of this type is superior both in strength and other characteristics compared with a single diagonal weld of the type according to Fig. 11.

Figure 15:
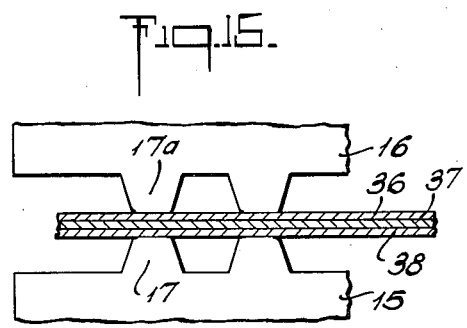
Fig. 15 is a view similar to Fig. 3 and illustrating the welding of more than two foils by means of twin-opposed indenters, the tools and foils being shown in the position prior to welding.

As pointed out, joining or welding of two foils according to the process of the invention is greatly facilitated if not predominantly caused by the drawing or stretching of the metals at the impressed areas, thus effecting an intimate union by molecular and/or crystal lattice transfer or diffusion. This makes it possible to weld more than two foils stacked one upon the other, as shown at 36, 37 and 38 in Fig. 15. Since substantially all the foils are subjected to the drawing or stretching action, welding of three or more foils is possible in substantially the same manner as welding two foils only. Thus, using a tool with the dimensions as given hereinabove, it was possible to safely weld a stack of eight foils of 0.003 inch thickness each. In making such a multiple foil weld provision should be made, by the proper design of the gap between the indenters, to allow the displaced metal to flow laterally and to form stiffening portions projecting from between the welded areas in accordance with the principle of the invention.

In the foregoing, the invention has been described with reference to a specific illustrative device and method. It will be evident, however, that modifications and variations of the construction shown and steps described, as well as the substitution of equivalent elements for those shown for illustration, may be made without departing from the broader scope and spirit of the invention as defined in the appended claims. The specification and drawings are accordingly to be regarded in an illustrative rather than in a limiting sense.

What I claim is:

1. A method of welding a plurality of relatively thin metal members of cold pressure weldable material having a thickness of less than about 0.030 inch comprising superimposing said members with the portions to be joined in contracting relation, applying indenting pressure to a plurality of substantially identical and uniformly spaced welding areas upon one face of the contacting portions, said areas having a minimum width in any direction equal to a multiple of and at least twice said thickness, to reduce the thickness and to create a drawing of the metal at said areas out of the initial plane thereof in the direction of the applied pressure and to cause a metal displacement laterally of said areas, the spacing distances between said areas being so related to the thickness of the members as to cause the metal displaced from each indented area to oppose the metal displaced from the adjacent indented areas and to force the metal of the intervening non-indented areas of said members out of the plane thereof in a direction substantially opposite to the applied pressure, as the pressure upon the indented areas is continued until producing a predetermined total percentage metal reduction thereat, whereby to pressure weld said members by a solid phase welding bond at said areas and to deform the welded portions of said members into a uniformly crinkled shape of increased mechanical strength.

2. A method of welding a plurality of relatively thin metal members of cold pressure weldable material having a thickness of less than about 0.030 inch comprising superimposing said members with the portions to be joined in contacting relation, applying indenting pressure to a plurality of identical parallel and uniformly spaced strip-like welding areas upon one face of the contacting portions, said strip-like areas having a minimum with equal to a multiple of and at least twice said thickness, to reduce the metal thickness and to create a drawing of the metal at said areas out of the initial plane thereof in the direction of the applied pressure and to cause a metal displacement laterally of said areas, the spacing distances between said areas being so related to the thickness of said members as to cause the metal displaced from each indented area to oppose the metal displaced from the adjacent indented areas and to force the metal of the intervening non-indented areas of said members out of the plane thereof in a direction substantially opposite to the applied pressure, as the pressure upon the indented areas is continued until producing a predetermined total percentage metal reduction thereat, whereby to pressure weld said members at said areas by a solid phase welding bond and to deform the welded portions of the members into a uniformly corrugated shape of increased mechanical strength.

3. A method of welding a plurality of relatively thin metal members of cold pressure weldable material having a thickness of less than about 0.030 inch comprising superimposing said members with the surfaces to be joined in contacting relation, applying pressure to one face of the contacting members at a continuous sinuous linear indentation weld area including a plurality of straight parallel and uniformly spaced portions and connecting portions alternately joining adjacent opposite ends of said parallel portions, said weld area having a minimum width equal to a multiple of and being at least twice said thickness, to reduce the metal thickness and to create a drawing of the metal at said area out of the initial plane of said members in the direction of the applied pressure and to cause a metal displacement laterally of said area, the spacing distances between said parallel weld line portions being related to said thickness, to cause the metal displaced from each parallel portion to oppose the metal displaced from the adjacent parallel portion and to force the metal of the intervening non-indented areas of said members out of the plane thereof in a direction substantially opposite to the applied pressure, as the pressure application upon the members is continued until producing a predetermined total percentage metal reduction at said area, whereby to pressure weld and seal said members at said area by a solid phase welding bond and to deform the total welded area of said members into a uniformly corrugated shape of increased mechanical strength.

References Cited in the file of this patent

UNITED STATES PATENTS

| | | |
|---|---|---|
| 2,467,913 | Sanders | Apr. 19, 1949 |
| 2,522,408 | Sowter | Sept. 12, 1950 |
| 2,691,816 | Siegel | Oct. 19, 1954 |
| 2,703,997 | Sowter | Mar. 15, 1955 |

FOREIGN PATENTS

| | | |
|---|---|---|
| 682,192 | Great Britain | Nov. 5, 1952 |
| 689,893 | Great Britain | Apr. 8, 1953 |

OTHER REFERENCES

Latest Developments of Koldwelding, published in the Welding Journal, December 1950.